April 13, 1937.  B. F. W. HEYER  2,076,639
STORAGE BATTERY TESTING APPARATUS
Filed Jan. 27, 1932   2 Sheets-Sheet 1

Inventor
BENJAMIN F. W. HEYER
By Semmes & Semmes
Attorneys

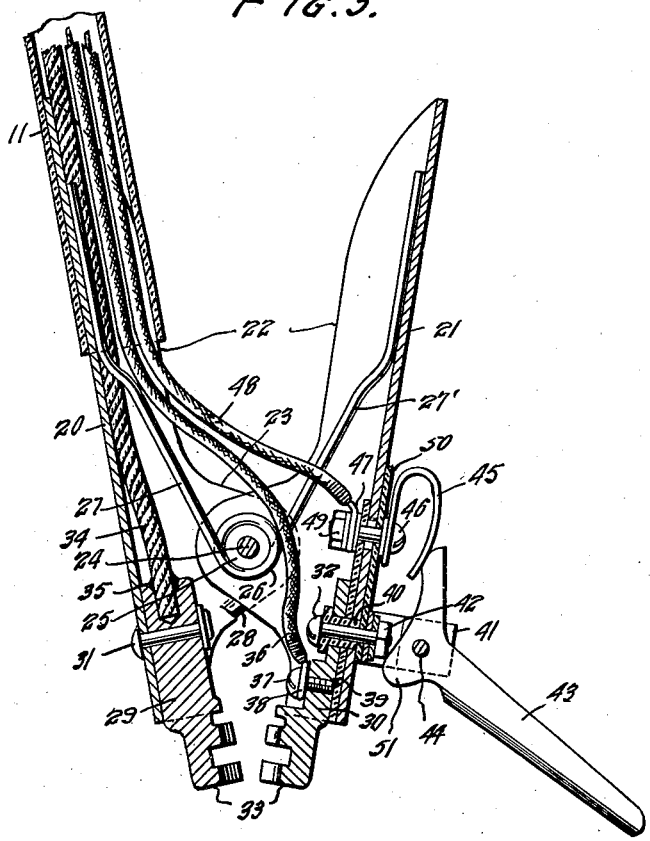
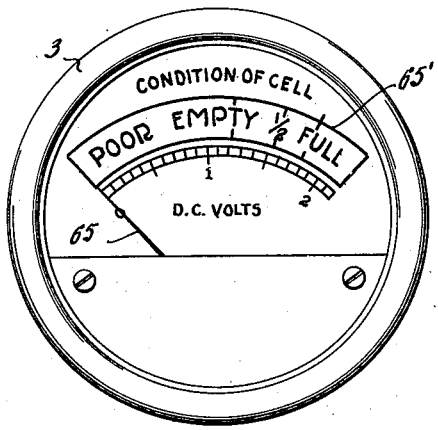
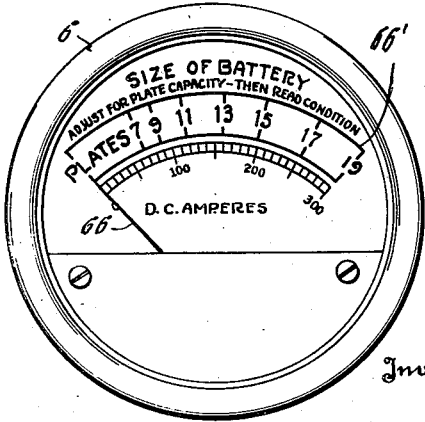

Patented Apr. 13, 1937

2,076,639

UNITED STATES PATENT OFFICE 2,076,639

STORAGE BATTERY TESTING APPARATUS

Benjamin F. W. Heyer, Bloomfield, N. J., assignor to Atlas Supply Company, Newark, N. J., a corporation of Delaware Application January 27, 1932, Serial No. 589,261

5 Claims. (Cl. 173—324)

This invention relates in general to electrical measuring instruments, and more particularly has reference to an apparatus for testing storage battery cells to determine the condition thereof by ascertaining the voltage drop across the cell terminals at the normal discharge rate thereof.

The present invention contemplates an improvement over that disclosed in my Patent No. 1,520,865, issued on December 30, 1924, for Apparatus and meter for testing batteries, particularly in the provision of clips whereby the voltage drop between the terminals of each cell of a conventional three cell storage battery while under discharge may be conveniently measured to indicate the condition of the separate cells.

My invention also comprehends the selective use of a conventional prod for determining the condition of the separate cells of a battery undergoing charging, with the same instrument employed for testing the condition of the cells while discharging.

In order to carry out my invention, I make use of a novel clip. While I am aware that clips of this character have been previously employed, I have devised a clip of greater mechanical and electrical efficiency than those heretofore available.

The devices of this character now obtainable are unsatisfactory for the reason that connection of the conductors from the tester circuit is usually made through the handles of the clips. This gives rise to a voltage drop across the handles, which causes an error in the registering of a voltmeter. Also it is necessary to construct clips, having handle connections of this character, of a metal of high conductivity, not subject to corrosion by proximity with battery acids. Thus, such electrically inefficient clips have been expensive to manufacture. Further, the types of contacts which have been employed on such clips have not been of a mechanical character capable of affording efficient connections with cell terminals for obtaining accurate readings from a tester.

An object of this invention is to provide a testing apparatus adapted to indicate the condition of each cell of a storage battery while under discharge.

Another object of this invention is to provide an electrically efficient clip for engaging the terminals of storage battery cells for connection in a circuit to determine the condition of the separate cells.

Still another object of this invention is to provide a mechanically efficient clip for engaging the terminals of storage battery cells for connection in a circuit to determine the condition of the separate cells.

A further object of this invention is to provide a testing apparatus adapted to indicate the condition of each cell of a storage battery while under discharge, having an attachment for determining the condition of the separate cells while undergoing charging.

With these and other objects in view which may be incident to my improvements, the invention consists in the parts and combination to be hereinafter set forth and claimed, with the understanding that the several necessary elements comprising my invention may be varied in construction, proportions and arrangement without departing from the spirit and scope of the appended claims.

In order to make my invention more clearly understood, I have shown in the accompanying drawings means for carrying the same into practical effect without limiting the improvements in their useful applications to the particular constructions, which for the purpose of explanation, have been made the subject of illustration.

In the drawings forming a part of this specification:

Figure 3 is a sectional view of my novel clip, from the side.

Figure 4 is a front view illustrative of the indicia on one of the voltmeters which I employ.

Figure 5 is a front view illustrative of the indicia on the ammeter which I employ.

Figure 1:
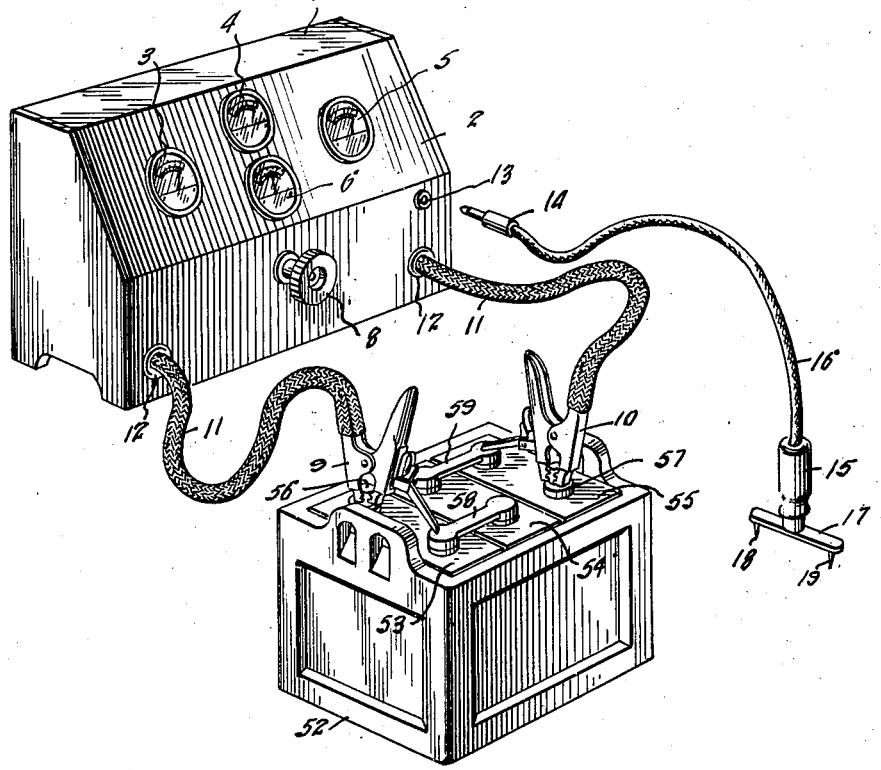
Figure 1 is a perspective view of my testing apparatus showing the clips connected therewith, attached to the cell terminals of a conventional storage battery, and the prod which may be selectively connected thereto.

Referring more particularly by numerals to the drawings in which the same and similar elements are designated by like symbols of reference throughout, and more especially to Figure 1, there is shown my storage battery testing apparatus comprising a casing or housing 1, preferably composed of any suitable metal, having a front face 2. A plurality of voltmeters 3, 4 and 5, and an ammeter 6, are mounted on the face 2. A handle 8 is also provided on the face of the apparatus for operation of a variable resistance unit in circuit with the ammeter, to be later described.

A pair of clips 9 and 10 are connected in circuit with the voltmeters and the ammeter, the conductors joining the same being enclosed in insulator sheaths 11 extending through apertures 12, provided in the face of the casing 1. An aperture 13 is also provided in the face of the casing 1 for receiving a double contact jack 14 connected to a conventional prod 15 through insulated conductors enclosed by an insulator sheath 16.

The prod comprises an insulator handle composed of wood or other material having a bar 17 fixed on the end thereof. The conductors enclosed in sheath 16 are adapted to extend through an aperture in the handle for connection with pointed members 18 and 19 formed on the ends of the bar 17, but out of contact therewith. The pointed members 18 and 19 are adapted to engage the respective terminals of a battery cell.

The clips 9 and 10, as better shown in Figure 3, each comprise handles 20 and 21 formed from any suitable metal, preferably by stamping, provided with inwardly flanged sides 22, having ears 23 formed on the edges thereof adjacent the lower ends. The ears are connected by a pin 24 extending through apertures provided therein so that the handles 20 and 21 are pivoted together. The pin 24 is adapted to extend through a collar 25 interposed between the adjacent inner ears so as to space the same. The spacer 25 is encompassed by a spiral spring 26 having extensions 27 and 27' fitting against the inner sides of the handles 20 and 21 to bring the lower ends of the same together by the tension exerted by the spring.

The lower ends of the handles are held out of contact by broken away portions 28 formed on the ears of one handle, engaging the edges of the ears formed on the other handle, so as to act as stops to prevent contact of the lower ends of the handles. The provision for preventing contact of the lower ends of the handles is made in order to accommodate the selective use of a prod in the circuit, to be later described. If it is not desired to provide for use of the prod, this feature may be dispensed with and the ends allowed to contact or if it is desired to use the prod and not have the ends of the handles held apart, a separate circuit opening device may be employed.

Terminal contacts 29 and 30, composed of suitable conductor material, preferably of a character not affected by contact with battery acid, are fixed on the lower ends of the handles by a rivet 31 and a bolt 32, respectively, extending through registering apertures in the contacts and handles. The contacts 29 and 30 are formed with serrated extensions 33, projecting below the lower ends of the handles for grasping of the terminal of a storage battery. It is to be noted that the extensions 33 are held out of contact by the broken away portions 28 formed on the ears on one handle, engaging the edge of the ears on the other handle, so that these terminal members do not touch. Thus, a circuit is only completed between the contacts 29 and 30 by the interposition of a storage battery terminal therebetween. As already stated, if it is not desired to selectively use a prod to be later described, the terminal members may be allowed to contact.

An aperture is provided in the top portion of the contact 29 for receiving the end of conductor 34 of large diameter preferably formed as a cable, adapted to extend through the insulator sheath 11 for connection with the ammeter. The connection of the conductor 34 with the contact 29 may be reinforced by soldering, as at 35.

A conductor 36 also extending through the insulator sheath for connection to the voltmeters is fixed to the contact 30 by a screw 37. The screw 37 extends through a terminal cap 38, attached to the end of the conductor, and a threaded aperture provided in contact 30. The contact 30 is spaced from the handle 21 by a piece of insulating material 39, and thus fixed out of contact therewith.

The bolt 32 for fixing the contact 30 on the handle 21 is extended through an insulator collar 40 and through an aperture provided in the handle 21 for engaging and fixing a bracket 41 on the handle 21. The bracket having the bolt 32 extending through an aperture therein is fixed on the handle by a nut 42.

An arm 43, shaped in the form of a bell crank, is pivoted on the bracket by a pin 44. The top end of the arm 43 is adapted to rest against a turned over leaf spring 45 fixed on the handle 21 by a bolt 46 extending through an aperture provided in the handle and through a terminal cap 47 fixed on the end of a conductor 48, also extending through the sheath 11 for connection to the tester circuit. The cap 47 is fixed on the bolt 46 by a nut 49.

The bracket 41 and the arm 43 and the leaf spring 45 are insulated from the handle 21 by a piece of insulator material 50 interposed therebetween. Downward movement of the arm 43 is limited by a shoulder 51 formed thereon contacting with the nut 42 fixing the bracket on the handle 21.

The extensions 33, integrally formed on the contacts 29 and 30 and the arm 43, are adapted to make contact with the end and intermediate cell terminals of a storage battery. It will be noted that these members are connected to the conductors 34, 36 and 48, respectively, the connection of the contacts 33 and the conductors 34 and 36 being direct. While the conductor 34 makes contact with the clip handle, the conductors 36 and 48 are insulated so that these three electrical conduits are insulated from one another.

The clips 9 and 10, as has already been pointed out, are adapted to be connected to the terminals of the conventional three cell storage battery such as shown in Figure 1, comprising a case 52 for enclosing cells 53, 54 and 55, having end terminals 56 and 57 and intermediate bridges 58 and 59 connecting the end cells with the center cell. The extensions 33 formed on the contacts 29 and 30 on the clips 9 and 10, are adapted to engage the terminals 56 and 57 on the end cells. This is accomplished by grasping and squeezing of the handles against the tension of the spring 26, so that when the pressure is released, the tension of the springs will hold the extensions 33 on each clip in firm engagement with the respective end terminals. The arms 43 on the clips 9 and 10 are adapted to engage the opposite terminals on the end cells connected by the bridges 58 and 59 to the terminals on the center cell. The arms 43 are formed with knife edges so as to insure a good connection thereof with the terminals with which the same are adapted to make contact.

In constructing the clips with separate attached contacts, with particular reference to the contacts 29 and 30, the difficulties which have attended clips of this type in the past making use of integrally formed contacts, are entirely eliminated. No voltage drop across the handles causing an error in the meter reading can occur, as the conductors are connected directly to the contacts. Also, in constructing the handles and contacts separately, an inexpensive material may be employed for making the body of the clips. Further, conductors of a character not subject to corrosion by battery acid fumes, such as lead, may be used for the contacts, while the handles not liable to contact with battery acid and adapted to form a part of the circuit may be composed of any suitable inexpensive metal.

The clips 9 and 10 are adapted to be connected to the terminals of a storage battery so as in conjunction with voltmeters to indicate the condition of each cell under discharge. In order to provide for obtaining the desired readings, as has already been described, the contacts 29 and 30 on each clip are engaged with the opposite end terminals on each end cell 53 and 55, respectively connected by the bridges 58 and 59 to the opposite terminals on the intermediate cell 54.

Figure 2:
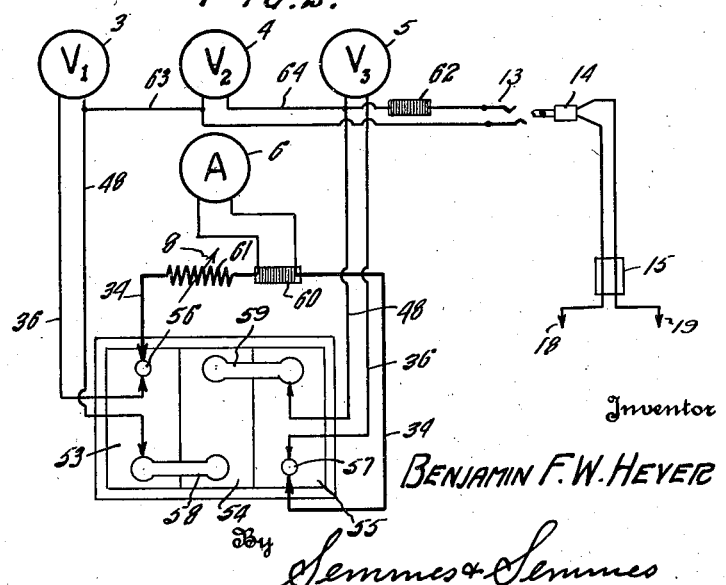
Figure 2 is a diagrammatic view showing the circuit of my testing apparatus, clips and prod.

The conductors 34 connected to the contacts 29 and extending through the sheaths 11 on the clips 9 and 10 are adapted to be connected to the ammeter 6, through a shunt 60, as shown in Figure 2. A variable resistance 61 is interposed in one of the conductors 34, manipulated by the handle 8, already described, shown on the testing apparatus in Figure 1.

The variable resistance 61 is adapted to be adjusted to cause the particular battery under test to discharge at the desired rate. A pointer 66 provided on the ammeter, shown in Figure 5, actuated by operation of the handle 8 is adapted to register the particular plate capacity of the battery under test according to the indicia on a dial 66', as determined from inspection of the battery. With this adjusted, the ammeter reading the condition of each cell according to the voltage drop, may be read on the respective voltmeters. The conductors 36 and the conductors 48 connected to the contacts 30 and the knife edge contacts 43, respectively, and extending through the sheaths 11 are connected to the end voltmeters 3 and 5, for indicating the condition of the end cells 53 and 55. The condition of the center cell 54 is determined by connection of the central voltmeter 4 between the conductors 48 by conductors 63 and 64.

It will be apparent from the foregoing that the voltmeter 3 is connected to the end cell 53 across the terminals 56 and 58 by the conductors 36 and 48 on the clip 9; the voltmeter 4 to the central cell 54 by the conductors 48 on the clips 9 and 10 across the terminals 58 and 59, and the voltmeter 5 to the opposite end cell 55 by the conductors 48 and 36 on the clip 10. Each of the voltmeters 3, 4 and 5 provided with the pointer 65 as shown in Figure 4, for indicating the condition of each cell whether bad, (poor), empty, half full or full, by indicia on a dial 65' actuated by the voltage drop of each cell under discharge at the desired rate, adjusted in accordance with the plate capacity of the battery by manipulation of the variable resistance in series with the ammeter, as has already been described.

The rate of discharge desirable to set as the standard is of course more or less arbitrary. The voltage drops off more under discharge if a battery is not fully charged than it does on a charged battery. The desirable rate of discharge may be varied, therefore, but usually is not more than sufficient to cause, on a new, fully charged battery, a drop from the open circuit voltage of 2 to 2.2 down to 1.8 volts.

It is often desirable to test the separate cells of the storage batteries which undergoing charging to determine the rate of charge and condition of the cell internally. Previously, a separate apparatus has been provided for this purpose. I provide a prod, however, connected in the circuit of my apparatus for normally testing the separate cells of a battery under discharge, for testing the cells of a battery while charging, making use of one of the voltmeters in the circuit of the testing apparatus. In this connection the lack of charge of a battery and the capacities of the cells are of course to be distinguished. In order to accomplish this, I connect the conductors of a conventional prod, which has already been described, across one of the voltmeters, for example, the voltmeter 4.

In testing a battery under charge, however, as distinguished from testing a discharging battery, the reading of the voltmeter is higher. In order to retain the same indicia on the dial of my voltmeter to avoid additional indicia that might tend to confuse an operator, I insert a multiplier 62 in series with one of the prod conductors so as to compensate for the difference in the reading and allow the indicia used for indicating the condition of a discharging cell, to indicate the condition of the same cell undergoing charging. In order to provide for the disconnection of the prod when its use is not desired, I connect the same to the voltmeter through a jack 14, as has already been described. If found more desirable, the multiplier may be incorporated in one of the voltmeters.

There is accomplished by this invention a battery testing apparatus wherein the condition of the separate cells of storage batteries of different plate capacities may be readily determined either while under discharge or while undergoing charging.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:—

1. A battery clip including a clamping device having jaws to clamp a battery terminal, a terminal contact secured to the lower end of each jaw for gripping said battery terminal, one terminal contact being electrically insulated from the jaw to which it is secured, a contact member pivoted to one of said jaws and swingable vertically relative to said clamping device, said contact member being electrically insulated from the jaw to which it is pivoted and adapted to engage an adjacent battery terminal during application of said jaws and to remain in contact with said terminal when said jaws are applied, and electrical connections to said terminal contacts and said contact member for connection to an ammeter and voltmeters for measuring the voltage drop across the separate cells of a battery while the latter is discharging.

2. A battery clip including a clamping device having pivotally connected jaws, a terminal contact secured to the lower end of each jaw for clamping a battery terminal, means associated with the jaws for yieldingly urging the terminal contacts toward one another, one terminal contact being electrically insulated from the jaw to which it is secured, a contact member pivotally connected to one of said jaws for swinging movement vertically relative to the clamping device, said contact member being electrically insulated from the jaws and terminal contacts and being adapted to engage an adjacent battery terminal during application of said jaws and to remain in contact with said terminal when said jaws are applied, means secured to one of said jaws for yieldingly holding said contact member in engagement with the last-mentioned battery terminal when the jaws are applied, and electrical connections to said terminal contacts and said contact member for connection to an ammeter and voltmeters for measuring the voltage drop across the separate cells of a battery while the latter is discharging.

3. A battery clip including a clamping device having pivotally connected jaws, a terminal contact secured to the lower end of each jaw, means for yieldingly urging said jaws toward one another whereby they will grip a battery terminal, said contacts being provided with teeth for use in scraping said battery terminal, one terminal contact being electrically insulated from the jaw to which it is secured, a contact member pivotally connected to one of said jaws for swinging movement vertically relative to said clamping device, said contact member being electrically insulated from the jaw to which it is pivoted and adapted to engage an adjacent battery terminal during application of said jaws and to remain in contact with said terminal when said jaws are applied, and electrical connections to said terminal contacts and said contact member for connection to an ammeter and voltmeters for measuring the voltage drop across the separate cells of a battery while the latter is discharging.

4. A battery clip including a clamping device having pivotally connected jaws, a terminal contact secured to the lower end of each jaw and adapted to clamp a battery terminal, means for yieldingly urging said terminal contacts toward one another, means for limiting the movement of the contacts toward one another to prevent them from contacting with each other, one terminal contact being electrically insulated from both jaws, a contact member pivotally connected to one of said jaws for swinging movement vertically relative to said clamping device, said contact member being electrically insulated from both jaws and adapted to engage an adjacent battery terminal during application of said jaws and to remain in contact with said terminal when said jaws are applied, and electrical connections to said terminal contacts and said contact member for connection to an ammeter and voltmeters for measuring the voltage drop across the separate cells of a battery while the latter is discharging.

5. A battery clip including a clamping device having pivotally connected jaws, a terminal contact secured to the lower end of each jaw, means cooperating with the jaws for yieldingly urging the terminal contacts toward one another to cause them to grip a battery terminal, one terminal contact being electrically insulated from both jaws, a contact member pivotally connected to one of said jaws for swinging movement vertically relative to said clamping device, said contact member being electrically insulated from the jaws and terminal contacts and being adapted to engage an adjacent battery terminal during application of said jaws and to remain in contact with said terminal when said jaws are applied, spring means for urging the contact member downwardly, stop means for limiting the downward movement of the contact member, and electrical connections to said terminal contacts and said contact member for connection to an ammeter and voltmeters for measuring the voltage drop across the separate cells of a battery while the latter is discharging.

BENJAMIN F. W. HEYER.